United States Patent [19]

Moss

[11] Patent Number: 4,698,372
[45] Date of Patent: Oct. 6, 1987

[54] MICROPOROUS POLYMERIC FILMS AND PROCESS FOR THEIR MANUFACTURE

[75] Inventor: Arthur Z. Moss, Wilmington, Del.

[73] Assignee: E. I. Du Pont de Nemours and Company, Wilmington, Del.

[21] Appl. No.: 774,024

[22] Filed: Sep. 9, 1985

[51] Int. Cl.$^4$ .......................... C08F 14/00; C08J 9/00; B29C 67/20; B29C 55/10

[52] U.S. Cl. ...................................... 521/145; 264/41; 264/288.8; 264/290.2; 264/DIG. 13; 521/149; 521/183; 521/184

[58] Field of Search .............. 264/41, DIG. 13, 288.8, 264/290.2; 521/145, 149, 183, 184

[56] References Cited

U.S. PATENT DOCUMENTS

| | | | |
|---|---|---|---|
| 3,738,904 | 6/1973 | Ikeda et al. | 161/117 |
| 3,783,088 | 1/1974 | Yoshiyasu et al. | 161/160 |
| 3,844,865 | 10/1974 | Elton et al. | 156/229 |
| 3,967,978 | 7/1976 | Honda et al. | 136/146 |
| 4,176,148 | 11/1979 | Magder et al. | 264/41 |
| 4,350,655 | 9/1982 | Hoge | 264/145 |
| 4,403,007 | 9/1983 | Coughlin | 428/95 |
| 4,430,468 | 2/1984 | Schumacher | 524/109 |
| 4,434,258 | 1/1982 | Schumadner et al. | 524/13 |
| 4,452,845 | 6/1984 | Lloyd | 428/220 |
| 4,472,328 | 9/1984 | Sugimoto et al. | 264/41 |
| 4,539,256 | 9/1985 | Shipman | 428/315.5 |

FOREIGN PATENT DOCUMENTS

2151538 7/1985 United Kingdom .

OTHER PUBLICATIONS

Billmeyer Jr., Fred W., Textbook of Polymer Science, second edition, New York, Wiley-Interscience, Div. of John Wiley & Sons, Inc., c 1971, pp. 130, 207–209, 237, 238.

*Primary Examiner*—Philip Anderson

[57] ABSTRACT

Microporous polymeric films having good water vapor transmission rates and hydrostatic resistance to the penetration of liquid water are obtained by stretching a composition consisting of a matrix of a thermoplastic orientable polymer having a hydrophobic surface, a glass transition temperature of less than 25° C., a Vicat softening point of more than about 25° C., an ultimate elongation between those two temperatures of at least 100%, and a flexural modulus of less than 200 MPa and a particulate filler having an aspect ratio of less than 3, an average diameter of 0.05–50 m, a negligible attraction to the matrix polymer, and a surface tension no higher than that of the matrix polymer at the latter's melting temperature.

Such films are useful in applications involving separation of liquids and vapors, e.g., in making "breathing" waterproof garments or linings.

58 Claims, No Drawings

MICROPOROUS POLYMERIC FILMS AND PROCESS FOR THEIR MANUFACTURE

FIELD OF THE INVENTION

This invention relates to soft, flexible, microporous films having high tear strength and to a process for making such films by stretching certain filled polymer compositions under controlled conditions.

BACKGROUND OF THE INVENTION

Films containing voids or pores have been made in the past by a variety of techniques from polymers containing solid substances dispersed therein. Sometimes voids were obtained by dissolving or leaching out those dispersed materials (or fillers), and sometimes voids formed when the filled polymeric material was stretched. In most porous filled polymer films, the filler was shown to nucleate the void formation upon stretching or leaching out see, for example, U.S. Pat. Nos. 3,738,904 (Ikeda et al.), 3,783,088 (Yohiyasu et al.) and 4,176,148 (Magder et al.).

Porous films produced heretofore by stretching filled polymer compositions were stiff, low tear strength products, irrespective of the type of matrix polymer used. Pore formation nearly always depended on propagation of cracks in the matrix polymer, and as a result, such films were fabricated with little or no control over pore size, making it impossible to achieve simultaneously high porosity and small pore size, which characterize microporous films made by more expensive methods from more expensive materials. Because of their stiffness, low strength, and lack of pore size control, those prior art stretched filled polymer films had a rather limited utility.

It thus is desirable to be able to produce soft, flexible, high strength, microporous films having high porosity by stretching filled polymeric materials.

SUMMARY OF THE INVENTION

According to the present invention, there is now provided a process for making a soft, tear resistant, microporous film consisting essentially of a polymer matrix and a particulate filler material dispersed therein, said film being substantially free of cracks detectable with an electron microscope and having a water vapor permeability of at least $$1.1 \times 10^{-5} \frac{kg/m^2 \cdot sec}{MPa/cm}$$

according to ASTM 96-66BW (inverted cup method) and possessing hydrostatic resistance to the penetration of liquid water of at least 0.25 kPa, said process comprising stretching at a temperature no higher than about 10° C. above the Vicat softening point but at least 10° C. above the glass transition temperature of the matrix polymer a precursor film having at most very low porosity and consisting essentially of the following components:

(a) a matrix of a thermoplastic orientable polymer characterized by
  (1) a hydrophobic surface, as indicated by a contact angle between said surface and a droplet of water of at least about 40°;
  (2) a glass transition temperature, $T_g$, of less than about 25° C.;
  (3) a Vicat softening point, $T_v$, of more than about 25° C.;
  (4) ultimate elongation at some temperature between $T_g$ and $T_v$ of at least 100%; and
  (5) a flexural modulus at 25° C. of less than about 200 MPa; (b) about 20–40%, based on the volume of the final composition, of a particulate filler chemically nonreactive with the polymer matrix and dispersed therein by melt-blending, said filler being characterized by
  (1) a sufficiently high softening temperature to avoid filler particle distortion at the lowest temperature at which the matrix polymer is sufficiently fluid to be satisfactorily melt-blended;
  (2) an aspect ratio of less than about 3;
  (3) an average equivalent spherical diameter of about 0.05–50 μm;
  (4) an at most negligible electrostatic or dipole attraction to the matrix polymer; and
  (5) a surface tension which either has at the lowest temperature at which the matrix polymer is sufficiently fluid to be satisfactorily melt-blended a value at most about equal to that of the matrix polymer or can be corrected to have under the blending conditions at most such a value by the adsorption on its surface of a third component (c);

said component (c) being an organic compound, which is liquid at the lowest temperature at which the matrix polymer is sufficiently fluid to be satisfactorily melt-blended and is capable at that temperature of being adsorbed on the surface of filler (b) to the extent of at least about $0.5 \times 10^{-5}$ mole of component (c) per square meter of surface area of filler (b), as calculated from the average equivalent spherical diameter of filler (b), and being present in the blend in an amount at least sufficient to satisfy this requirement; said component (c) being characterized by
  (1) at most negligible solubility in the matrix polymer at the melt-blending temperature;
  (2) chemical inertness to the matrix polymer;
  (3) a number average molecular weight of about 100–10,000; and
  (4) a surface tension which at a temperature at which component (c) is liquid has a value at most about equal to that of the matrix polymer.

There are also provided microporous films made by the above process.

DETAILED DESCRIPTION OF THE INVENTION

Definitions:

For the purpose of this specification and the claims appended hereto, various terms used herein have the following meanings:

"Soft" means that when Shore hardness measurement is made according to ASTM D-2240, a reading of less than 75 is obtained on the C scale or less than 100 on the A scale.

"Microporous" means containing numerous open pores or channels leading from one surface to the opposite surface and having good resistance to the penetration of liquid water (in this case set at 0.25 KPa or higher, as stated in the Summary of the Invention).

"Aspect ratio" is the ratio of the largest dimension to the smallest dimension of a particle. For any given filler, the aspect ratio is the average value determined for a representative number of particles by microscopic examination.

"Equivalent spherical diameter" is the diameter of a sphere having the same volume.

The term "tear resistant", in the context of this disclosure and claims, means substantially more tear resistant than paper of the same thickness, when a sample is subjected to hand-tearing. Elmendorf tear strengths, ASTM D-1922-67, of a few representative microporous films of this invention were determined and were found to be in excess of 1000 g/mm.

1. Polymers

Generally speaking, a variety of materials can be selected as matrix polymers. Their selection will be based in the first place on the desired properties of the microporous film, for example, temperature resistance or elastic recovery. Thermoplastic, orientable polymeric materials which exhibit tensile yielding and some permanent deformation may be used, provided the other characteristics listed for polymer component (a) in the Summary of the Invention are satisfied.

Preferably, flexural modulus should be less than 100 MPa, especially less than 75 MPa. Such polymers are sufficiently flexible to form useful microporous films according to this invention.

Glass transition temperature below about 25° C. indicates that the polymer is in its so-called rubbery state of room temperature. Preferably, Tg should be below 0° C. When low temperature flexibility is important, Tg should be below −20° C.

Vicat softening point is an indication of polymer chain mobility. In order to prevent the pores formed by the process of this invention from collapsing in use, preferably, it should be above 45° C.

For ease of pore formation and optimum control of pore size, ultimate elongation preferably should be at least 500%, and especially 700%, at some temperature between Tg and Tv.

Suitable polymers, which satisfy the requirements (2) through (5) listed for matrix polymer (a) in the Summary of the Invention fall into the class of so-called low crystallinity polymers. They include, among others, certain ethylene copolymers, copolyesters, and copolyamides. The ethylene copolymers suitable for the practice of this invention are copolymers with at least one comonomer selected from the group consisting of vinyl esters of saturated $C_1$–$C_4$ carboxylic acids; unsaturated $C_3$–$C_5$ mono- or dicarboxylic acids, their salts with ammonia and with metals of Groups I-IV of the Periodic Chart of the Elements, and their $C_1$–$C_8$ alkyl esters; terpolymers of the general formula E/X/Y, where E stands for ethylene, X for vinyl acetate or a butyl acrylate, and Y for carbon monoxide or sulfur dioxide, the weight proportion of comonomer Y being up to about 15%; and elastomeric dipolymers and terpolymers of ethylene with other 1-olefins and 1,4-dienes.

Copolyesters include, for example, various copolyetheresters such as copolymers of phthalic acids with a diol providing "hard" segments, such as 1,4-butanediol, and a diol providing "soft" segments, such as poly(tetramethyleneether glycol), some of which are commercially available from the Du Pont Company.

Suitable polyamides may include, for example, copolymers or terpolymers of caprolactam, hexamethyleneadipamide, hexamethylenesebacamide; hexamethylenedodecanamide, ω-laurolactam, 11-aminoundecanoic acid, isophthalic acid, terephthalic acid and polyesteramides in which no single monomer is present in a concentration greater than about 50% by weight.

Other thermoplastic, orientable materials which meet the basic requirements of this invention enumerated in the Summary of the Invention also can be employed.

In general, polymers, including copolymers and polymer blends, which do not have highly reactive groups are preferred; and polymers and fillers are preferably chosen so that they are not highly reactive to each other. While ionomers and carboxylic acid copolymers may be used in principle, they are less desirable because fewer fillers are available for combining with them.

Polymer blends which may be used in the practice of this invention, also must satisfy the above-recited requirements, even though individual polymers in such blends need not do so. Typical polymer blends include, for example, two different ethylene/vinyl acetate copolymers and a blend of polyvinyl chloride with an ethylene/vinyl acetate/carbon monoxide terpolymer.

The polymers suitable for use in this invention may be modified to achieve desired properties. Modification may take place after formation of the microporous film by chemical or radiative cross-linking or heat-setting; or before, by plasticization. It has been found that use of polymer-soluble additives used conventionally to plasticize the unfilled polymer can increase the range of porosity and pore size achievable from a given composition.

2. Fillers

The selection and use of fillers are to a large extent based on the following considerations:

(a) filler size and shape;
(b) filler loading, i.e., the volume fraction of filler in the final composition; and
(c) interaction of filler with polymer.

(a) Filler size and shape

As will be discussed in more detail later in this description, the filler size ultimately determines the pore size of the microporous films of this invention. Thus, smaller fillers permit attainment of smaller pores compared to larger fillers at equal loading and equal over-all porosity. There is no theoretical limitation on the size of fillers which may be used in the practice of this invention. However, practical considerations impose effective limitations.

Fillers with average equivalent spherical diameter greater than 50 μm result in excessive discontinuity of and stress build-up in the matrix polymer; also the pore sizes which result usually are undesirably large. At the other extreme, fillers of the order of 0.10 μm in diameter or smaller are extremely difficult to work with, particularly in terms of breaking up agglomerates and obtaining uniform dispersion. Most such fillers form extended agglomerated structures with pronounced reinforcing tendencies, an effect specifically to be avoided in the practice of this invention because of the increase in stiffness and decrease in toughness usually associated with such reinforcement.

The preferred equivalent spherical diameter is 0.10 μm to 5 μm. As important as the average equivalent spherical diameter is the shape of the particle size distribution curve. It is known in the field of filled polymer compositions that a relatively small number of particles much larger than the average may adversely affect mechanical properties. In the case of microporous films, there is the additional effect that larger particles lead to larger pores. Since much of the utility of microporous films depends on the maximum pore size, a small percentage of large particles would result in an undesirably large maximum pore size. On the other hand, particles very fine compared to the mean contribute very little to the porous morphology, and thus take up space which could be better utilized for the formation of pores. Thus a reasonably narrow particle size distribution is desirable. A particle size distribution in which fewer than about 1% of the particles exceed about 20 μm is preferred, especially when fewer than about 1% exceed 10 μm.

Equivalent spherical diameter of fillers may be determined by a variety of known experimental techniques. The use of the light-scattering-based "Microtrac" instrument manufactured by Leeds and Northrup, Inc., appears to be particularly useful. Unless otherwise noted, average and maximum equivalent spherical diameters given herein were determined with the Leeds and Northrup Microtrac.

Just as extended agglomerated structures induce undesirable reinforcing effects, so do fillers having high aspect ratios. The preferred aspect ratio is less than 2.

(b) Filler Loading

Filler loading determines to a high degree how far the precursor film must be stretched to attain a given degree of overall porosity. Below the lower end of the loading range, the pores produced by stretching tend to be larger than desired and no longer fall within the range of micropores. Above the higher end of the loading range, the continuity of the polymer matrix tends to become disrupted. The preferred loading is about 25-35 volume percent, especially about 30 volume percent.

(c) Interaction of Filler with Polymer

The filler should have a minimum degree of interaction with the polymer. In general, the filler should not be chemically reactive with respect to the matrix polymer; chemical reactivity includes Lewis acid/base interaction. Further, the melting point of the filler should be sufficiently well above that of the matrix polymer, so that the filler remains substantially undistorted during the melt-blending process.

Inorganic fillers preferred for the practice of this invention include: calcium carbonate, barium sulfate, powdered metals, magnesium carbonate, calcium sulfate, silica, glass spheres, aluminum hydroxide, etc. Other inorganic fillers include those with higher aspect ratios such as talc, mica, and wollastonite; but such fillers are less beneficial. Representative organic fillers are powders of poly(hexamethylene adipamide), poly-(ethylene terephthalate), and other highly crystalline, high melting polymers; beads of poly(styrene divinyl benzene) and other highly crosslinked polymers.

3. Antagonizer

In general, the polymers suitable for use as matrix polymers in the practice of this invention have surface tensions in the melt of about 10 to 40 mJ/m$^2$, mostly about 20 to 40 mJ/m$^2$, with fluoropolymers falling between 10 and 20 mJ/m$^2$. tensions ranging from a low of about 65 mJ/m$^2$ (e.g. calcium carbonate) to about 1200 mJ/m$^2$ (glass beads). Organic fillers such as nylon powder or poly(styrene-divinylbenzene) have surface tensions in the same range as those of the matrix polymers. Filler surfaces having very high surface tensions such as those of glass beads, tend to become coated with low surface tension organic contaminants normally present in the environment, which thus effectively reduce the surface energy of the high energy fillers to a low energy level.

In the case of inorganic fillers it has often been found to be necessary—and in some cases of both organic polymeric fillers and contaminated glass beads, useful but not necessary—to incorporate into the filled composition an antagonizer in order to reduce the effective surface tension of the filler to the approximate level of that of the matrix polymer. The term "antagonizer", which does not have an established meaning in the art, has been adopted to designate component (c) defined in the Summary of the Invention. An antagonizer, unlike a wetting agent, tends to decrease wetting of surfaces of one material with another material.

The antagonizer should be chosen according to the following criteria: low or no solubility in the matrix polymer; no reactivity toward the matrix polymer; a surface contact angle on the surface of the polymer of less than about 40° (the surface tension of the antagonizer should be less than or about equal to that of the matrix polymer); it should be nonfugitive during compounding; it should be a low-viscosity liquid at the compounding temperature, but need not be a liquid at room temperature.

The antagonizer need not show a particular chemical or physical affinity for the filler, so long as the agent wets the filler at least as effectively as does the matrix polymer, or otherwise shields the filler from the polymer. However, appropriate antagonizers with specific affinity for the filler may be used to good effect. When the antagonizer does have a specific affinity for the filler, as, for example, in the case of stearic acid for calcium carbonate, it is only necessary that the surface presented to the polymer—in this example, the hydrophobic tail of the stearic acid molecule—be of low surface tension.

When the filler is an organic polymer or is an inorganic material contaminated with organic material, it is often found that microporous films having good properties can be obtained without an antagonizer, although normally an antagonizer is preferred for optimum performance. However, in other cases, an antagonizer is necessary. When an antagonizer must be present, its concentration should be at least about $0.5 \times 10^{-5}$ mole per square meter of filler surface area, with the range of about $1.0 \times 10^{-5}$ to $5 \times 10^{-5}$ mole/m$^2$ preferred. Concentrations much beyond $10 \times 10^{-5}$ mole/m$^2$ appear to result in some deterioration in properties. The amount of antagonizer to be added may be calculated as follows:

let d=equivalent spherical diameter of filler(m)
D=density (or specific gravity) of filler (g/m$^3$)
P=weight of average particle of filler (g)
A=surface area of average particle of filler (m$^2$)
W=weight of antagonizer per gram of filler(g)
m=moles of antagonizer per particle
M=molecular weight of antagonizer then $$A = \pi \times d^2$$

$$0.5 \times 10^{-5} A < m < 5.0 \times 10^{-5} A$$

P=$(\pi \times d^3 \times D)/6$
W=$m \times M/P$

When the aspect ratio of the filler is less than about 1.5, this calculation is valid without further correction.

However, when the aspect ratio is greater than about 1.5, and with increasing importance as aspect ratio increases, a surface area correction factor depending on the particle geometry must be used. The correction factor is equal to Af/As, where Af is the actual surface area of the filler, and As that of a sphere of equivalent volume. Af can be roughly calculated by observing the shape of filler particles under an electron microscope and calculating the surface area by applying well known geometric equations. For particles less than about 0.1 μm in average equivalent spherical diameter, determination of size is less certain, and uniform dispersion of filler is more difficult. Filler agglomeration results in somewhat lower effective surface area.

The antagonizer may be combined with the filler in any convenient manner, for example, at the melt-blending step, or by separately blending the antagonizer with the filler and then melt-blending this blend with the polymer, or by adsorbing the antagonizer from a solution in an appropriate solvent on the filler removing the solvent, and blending the filler containing the antagonizer adsorbed thereon with the polymer.

Theoretical Considerations

The force of attraction between polymer and filler is called the work of adhesion. When dispersion forces predominate in such an interaction, the work of adhesion depends primarily on the difference of the surface tensions of the polymer and filler respectively. When the surface tension difference is large, it is known that the lower surface tension material, such as an organic polymer, will wet the higher surface tension material, such as an inorganic filler—that is, have zero contact angle on the higher tension surface. In many cases involving polymers with inorganic fillers, the work of adhesion between them may exceed the breaking strength of the polymer. This is particularly true of large or high aspect ratio fillers. In the case of organic, particularly polymeric, filler, the surface tensions of matrix polymer and polymeric filler are similar, so that the matrix does not fully wet the filler surface; consequently the work of adhesion is low.

Scanning electron micrographs of microporous films of this invention show that the pores consist of an interconnecting network of voids which have opened up around the filler particles during stretching. Particularly notable is the virtually complete absence of cracks in the polymer matrix, and the very low degree of apparent adhesion between polymer and filler. It is believed that this morphology is a direct result of the achievement of low work of adhesion between polymer and filler, namely, a work of adhesion approximately equal to or less than the yield stress of the matrix polymer as indicated in stress-strain tests. It is further believed that this low work of adhesion is obtained by combining fillers and polymers with comparable surface tensions so that the given polymer incompletely wets the surface of the given filler (that is, has a contact angle thereon larger than zero). Under such conditions of low work of adhesion, the polymer-filler interface is not a source of significant stress concentration; consequently, so long as the matrix polymer is present in a sufficient amount to be considered a continuous phase, the polymer exhibits elongation performance similar to that of the unfilled polymer. The matrix polymers used in this invention are normally ductile materials which are known in the art to fail under strain by the process of "microvoid coalescense" rather than brittle fracture.

The failure mechanism of the matrix polymer is retained in the filled compositions of this invention, and the porosity in films thereof results from the normal failure mechanism of the polymer, wherein the filler has been used to seed or nucleate numerous voids in excess of those that exist in the unfilled polymer.

In the case of most inorganic fillers, there is a significant surface tension difference between polymer and filler. Addition of an antagonizer such as described above reduces the effective surface tension of the filler, the antagonizer becoming adsorbed on the filler surfaces and preventing the matrix polymer from wetting the filler.

Compounding

Compounding of the compositions of this invention may be accomplished by any known method suitable for the melt blending of thermoplastic polymers at temperatures at which the matrix polymers are processable. High shear mixing, which can be achieved in a Banbury-type or another high intensity mixer or in continuous mixers such as extruders, is preferred. There is no need to premix ingredients, but this may be done without detriment to the practice of this invention and may in certain instances offer improved performance. After blending, the composition may be converted into any convenient form for processing into film, including pellets or sheets.

Particles with an average equivalent spherical diameter nominally (i.e., as specified by the manufacturer) less than about 0.1 μm, are preferably premixed with any necessary wetting agent in a high shear aerosol jet or in an emulsion in order to break up agglomerates as effectively as possible.

Film Fabrication and Stretching

Films or sheets may be fabricated by any convenient technique including compression molding, flat film extrusion, or blown film extrusion.

Stretching may similarly be accomplished by any convenient technique including by pantograph, by hand, hydraulically, by pinch rolls moving at different rates, or by tentering. Stretching may be uniaxial, biaxial, or radial. Biaxial stretching may be applied sequentially or simultaneously. Sequential biaxial stretching is preferred. The rate of stretching may be in the range of about 1% per second to about 100% per second or greater, with about 50% per second preferred.

Stretching is effected, preferably at least 20° C. above the glass transition temperature of the matrix polymer and preferably below the Vicat softening temperature of the matrix polymer, especially within 10° C. of that temperature, depending to some degree on the rate of stretching. The optimum temperature for stretching a given composition is that temperature within the range from 10° C. above the glass transition temperature to the Vicat softening point at which test specimens of the composition display the highest degree of orientability in a standard stress-strain test.

Different polymers and compositions thereof exhibit different elastic and viscoelastic behavior. Thus differing amounts of stretch must be imposed on different samples in order to obtain the same permeability properties. However, in any event, the film must be stretched beyond its yield point in order to attain the permanent deformations necessary for the formation of porosity. Biaxial elongation of at least 50% is required, with at least 100% preferred. Uniaxial elongation of at least about 50% is required with at least about 125% preferred. When the thermoplastic matrix material has a high degree of recovery after stretching, porosity induced in the stretched film will be lost to a large extent in the recovered film. In order to reduce elastic recovery after stretching, and thus to preserve satisfactory permanent porosity, a stretched, microporous film can be heat set. This treatment involves exposing a film under strain to temperatures above the Vicat softening point; this must be done rapidly to avoid healing the pores and may be accomplished with conventional techniques such as tenter frames and infrared or microwave heating. Films may also be crosslinked, whether under strain or relaxed.

For a given composition, a greater degree of stretch results in greater overall porosity and greater pore size. Higher overall porosity at constant pore size, or smaller pore size at constant porosity, may be attained by adding more filler and stretching, respectively, the same amount or less. Alternatively a smaller filler may be used in the same volume loading which for the same degree of stretching will provide the same porosity with smaller pore size.

The microporous films of the present invention are particularly suitable in applications involving the separation of liquids from vapors, for example, in "breathable" waterproof garments, diaper liners, blankets, and such; in construction elements such as, for example, greenhouse walls or ceilings; in filtration and adsorption, such as filtration of biological solutions or of fermentation products, etc.

This invention is now illustrated by representative examples of various embodiments thereof, wherein all parts, proportions, and percentages are by weight unless otherwise indicated. All units of measurement not originally obtained in SI have been converted to SI units.

The materials employed are described in Tables 1-4 which describe respectively, the polymer matrix, the fillers, the antagonizers, and the conventional plasticizers employed in the compositions from which the specific embodiments of this invention have been fabricated. Table 5 describes the compositions which have been employed for the fabrication of microporous films or for the purposes of comparison. Table 6 summarizes the fabrication and character of the microporous films and comparative examples.

The following test methods were employed:

ASTM D-2240: Shore hardness, scales A and C, a given reading indicating greater hardness if made on the C, rather than the A, scale.

ASTM D-790: Flexural modulus at room temperature, in megapascals, MPa.

ASTM E-96-66BW: Conditions were maintained at 50% relative humidity and 23° C. Water vapor permeability (WVP) is expressed in $kg/m^2$. sec per MPa of vapor pressure driving force per cm of thickness, and water vapor transmission rate (WVTR) in $kg/m^2$. sec per MPa.

Fed. Test Method

Std. No. 191A, Method 5512: Hydrostatic water entry pressure (HWEP), in MPa. When HWEP is indicated to be >0.25 kPa, as required, liquid water permeates the sample at pressures less than about 6.9 kPa but it does not permeate during the inverted cup test.

ASTM D-1922: Tear strength, Elmendorf, expressed in g/mm, ASTM D-1922. This determination was made only for representative samples, since it was found in qualitative evaluations that films of this invention belonging to the same matrix polymer class have comparable tear strength. In qualitative tests, all fims of this invention were considerably more resistant to hand-tearing than paper of the same thickness. Surface tension of additives was measured at 70° C. by the Du Nouy ring method, using a 70545 Tensiometer manufactured by Central Scientific Co., Division of CSC Scientific Corp., Broadview, Ill. The value of the surface tension at the mixing temperature—generally around 180° C. —was obtained by assuming a decrease with temperature of 0.1 $mg/m^2/°$ C. Surface tension of polymers was obtained from the book Polymer Interface and Adhesion, by S. Wu, published by Marcel Dekker, Inc., (1982) Where not available, it was estimated from data on materials of similar composition. Surface tension of fillers was obtained from published sources. Surface contact angles were measured according to ASTM D-1922-67 using a goniometer.

ASTM D-3418-75 Glass transition temperature was determined by differential scanning calorimetry (DSC).

ASTM D-1525 Vicat softening point.

ASTM D-638 Ultimate elongation.

The materials used in the examples are listed below in Tables 1-4.

TABLE 1

POLYMERS USED IN THE EXAMPLES

| POLYMER DESIGNATION | COMPOSITION | SURFACE TENSION (180° C.) $mJ/m^2$ | FLEXURAL MODULUS MPa | VICAT SOFTENING POINT °C. | VICAT WITH PLASTICIZER °C. | Tg °C.* |
|---|---|---|---|---|---|---|
| P-1 | Ethylene/vinyl acetate 92:8 copolymer | 25.0 | 62.0 | 64 | | −25 |
| P-2 | Ethylene/vinyl acetate 67:33 copolymer | 25.0 | 6.9 | | | −25 |
| P-3 | Ethylene/vinyl acetate 75:25 copolymer | 25.0 | 30.0 | | 49 | −25 |
| P-4 | Polyetherester copolymer: 27.4% terephthalic acid, 7.9% isophthalic acid, 44.8% poly(tetramethylene ether) glycol, 19.5% 1,4- | est. 28.0 | 53.0 | 112 | 80 | −45 |

TABLE 1-continued

POLYMERS USED IN THE EXAMPLES

| POLYMER DESIGNA-TION | COMPOSITION | SURFACE TENSION (180° C.) mJ/m$^2$ | FLEXURAL MODULUS MPa | VICAT SOFTENING POINT °C. | VICAT WITH PLASTI-CIZER °C. | Tg °C.* |
|---|---|---|---|---|---|---|
| | butanediol | | | | | |
| P-5 | Copolyamide: 43% caprolactam, 33.6% hexamethylene adipamide, 23.4% hexamethylene sebacamide | est. 37.0 | ** | 134 | 125 | 0 |
| P-6 | Ethylene/propylene/-1,4-hexadiene terpolymer | est. 25.0 | 7.1 | | | −60 |
| P-7 | Polymer Blend: 65% ethylene/N—butyl acrylate/carbon monoxide, 35% stabilized poly(vinyl chloride) | est. 25.0 | 100.0 | | | −50 |
| P-8 | High density polyethylene | 24.6 | 690.0 | 122 | | −120 |

*Polymers P-1 through P-4 by dynamic mechanical analysis, ASTM D4065; Polymers P-5 through P-8 by differential scanning calorimetry, ASTM E357.
**Flexural modulus increased on storage at room temperature and could not be determined. Within several minutes to several hours after quenching, it was comparable to low modulus examples.

TABLE 2

FILLERS USED IN THE EXAMPLES

| FILLER | DESIGNATION | SPECIFIC GRAVITY | SURFACE TENSION | SIZE (μm) |
|---|---|---|---|---|
| Hydral, 710 ATH (Alcoa) | F-1 | 2.42 | 70 | 0.7 nom. |
| Atomite CaCO$_3$ (Thompson-Wyman) | F-2 | 2.74 | 70 | 5.70 |
| Multiflex CaCO$_3$ (Pfizer) | F-3 | 2.70 | 70 | 0.07 nom. |
| Glass spheres | F-4 | 2.46 | 1200 | 9.22 |
| Poly(styrene divinylbenzene) | F-5 | 1.16 | 29 | 50.00 |
| Nylon 66 | F-6 | 1.16 | 37 | 5.40 |
| MT Thermal black | F-7 | 2.00 | | 0.3 nom. |
| Micral 932 ATH (Solem Industries) | F-8 | 2.42 | 70 | 1.2 nom. |

TABLE 3

ANTAGONIZERS USED IN THE EXAMPLES

| DESIGNATION | COMPOSITIONS | SPECIFIC GRAVITY | SURFACE TENSION (180° C., est) (mJ/m$^2$) | MOLECULAR WEIGHT |
|---|---|---|---|---|
| A-1* | Polyester oil | 1.03 | 25 | 4000.0 |
| A-2 | Polypropylene glycol sebacate | 1.09 | 28 | 8000.0 |
| A-3 | Stearic acid | 0.94 | 14 | 284.5 |
| A-4** | Mixture of hydrocarbon oils: 5% aromatic 27% naphthenic 68% paraffinic | 0.89 | 18 | 720.0 |
| A-5** | Mixture of hydrocarbon oils: 36% aromatic 24% naphthenic 40% paraffinic | 0.92 | 20 | 610.0 |
| A-6** | Di-ethylcyclohexylamino salt of lauryl sulfate | 1.06 | 17 | 440.0 |

*A condensation product of adipic acid and 1,3-butanediol
**Available from Shell Oil Co.

TABLE 4

PLASTICIZERS USED IN THE EXAMPLES

| DESIG-NATION | PLASTICIZER | COMPOSITION |
|---|---|---|
| O-1 | "Circosol" 4240 (Sun Oil Co.) | Naphthenic hydrocarbon oil |
| O-2 | "Santicizer" 141 (Monsanto) | 2-Ethylhexyl diphenyl phosphate |
| O-3 | "Santicizer" | N—ethyl o- and p-toluenesulfon- |
| | 8 (Monsanto) | amide |

The compositions of all the examples are summarized in Table 5, and the experimental results are summarized in Table 6, following the examples.

The units for vapor permeability and water vapor transmission rate in the examples are omitted. The former are understood to be kg/m². sec per MPa of vapor pressure driving force per cm of thickness. The latter are kg/m². sec per MPa.

EXAMPLE 1

In this example, ethylene/vinyl acetate copolymer P-3 (Table 1) was employed. The flexural modulus of this polymer was 30 MPa. Calcium carbonate (F-2 in Table 2) was melt-blended into the polymer at a level of 19% by volume. Polyester oil of A-1 was employed at the level of $3.9 \times 10^{-5}$ mole/m². The Shore A hardness of this material was 84. A compression molded film of this material was stretched biaxially 2.5-fold at room temperature. The water vapor permeability (WVP) by ASTM, E96-66BW $5.8 \times 10^{-5}$; the water vapor transmission rate (WVTR) was $4.1 \times 10^{-3}$. The hydrostatic water entry pressure (HWEP) was 21 kPa.

Scanning electron microscopy of a cross-section of the microporous film of this example revealed a reasonably uniform array of voids each containing one or more filler particles which gave the appearance of simply hanging in the void but not adhering to the polymer surrounding it. The surface was an array of pores, with little filler apparent on it. It is believed that the filler, which adheres very loosely to the polymer, simply falls off the surface.

EXAMPLE 2

An uncrosslinked terpolymer of ethylene, propylene and 1,4-hexadiene, (P-6, Table 1) was filled to 25% by volume with the calcium carbonate of Example 1. Polyester oil A-1 was incorporated at a level of $3.1 \times 10^{31\,5}$ mole/m². The hardness of the composition was 27 C. A compression molded film was stretched biaxially 3.75-fold on a pantograph at 26° C. WVP was $5.3 \times 10^{-5}$. the WVTR $11 \times 10^{-3}$, HWEP, 27.6 KPa.

EXAMPLES 3 AND 4 (Both Comparative)

In these two examples, the critical effect of surface concentration of the antagonizer on microporous film-forming capability is demonstrated. A blend (P-7, Table 1) of polymers composed of 65% of a terpolymer of ethylene/n-butyl acrylate/carbon monoxide and 35% of stabilized poly(vinyl chloride) was filled to 30% by volume with the calcium carbonate of Example 1.

In the composition of Example 3 there was incorporated the polyester oil of Example 1 at a level of $1.2 \times 10^{-5}$ mole/m²; in that of Example 4, $0.6 \times 10^{-5}$ mole/m². Both compositions were compression molded into films and subjected to biaxial room temperature stretching on a pantograph. The film of Example 3 was stretched 2.5-fold in each direction. The WVP of the resultant film was $0.59 \times 10^{-5}$, the WVTR $0.20 \times 10^{-3}$, HWEP 414 KPa. The film of Example 4 could not be stretched after repeated tries. Instead it fragmented, showing none of the characteristic whitening that indicates the formation of extensive voids. While the WVP of the stretched film of Example 3 was below the desired value of $1.1 \times 10^{-5}$, the film had measurable porosity. The difficulty apparently arose because of elastic recovery of the film after stretching, which reduced the porosity.

Example 3 also shows that when the matrix polymer is highly elastomeric, the induced porosity can be drastically reduced on recovery. Permanent microporosity can be retained at a satisfactory level by heat-setting, as discussed earlier. However, even without heat-setting, the film could be used, e.g., in semipermeable pressure-controlling devices in which microporosity varies with the degree of stretch.

EXAMPLE 5

(Comparative)

High density polyethylene, P-8, (outside the scope of this invention) with a melt index of 0.2, a flexural modulus of 690 MPa, and a surface tension of 24.6 mJ/m² was filled to 36% by volume with the calcium carbonate of Example 1. The polyester oil of Example 1 was incorporated at the level of $2.6 \times 10^{-5}$ mole/m². A compression molded film was stretched two-fold biaxially on a pantograph at 70° C. The WVP of the resultant film was $360 \times 10^{-5}$ and WVTR $136 \times 10^{-3}$, but with HWEP of zero; the film wetted out during testing by the inverted cup method, suggesting lack of pore size control. The hardness of the composition of Example 5 was 92C. The resultant film was stiff, and paper-like, with tear strength of 360g/mm, much below the films of this invention.

EXAMPLES 6-8

In these examples the criticality of antagonizer surface concentration is further exemplified. The polymer of Example 1 was filled to 29% by volume with aluminum oxide tri-hydrate (F-1, Table 2). The surface tension of the filler was estimated to be 70 mJ/m². The polyester antagonizer of Example 1 was incorporated into the composition of Example 6 at the level of $0.42 \times 10^{-5}$ mole/m² and in Examples 7 and 8 at the level of $0.59 \times 10^{-5}$ mole/m². Both compositions were compression molded into film and subjected to stretching on a pantograph at 30° C. The film of Example 6 (comparative) could not be stretched, but rather fragmented with little or no indication of the whitening associated with void formation. The film of Example 7 was stretched 2.75-fold biaxially. The WVP was $55 \times 10^{-5}$, the WVTR $98 \times 10^{-3}$, HWEP $>0.25$ kPa. The film of Example 8 was stretched 2.6 fold biaxially. The WVP was $87 \times 10^{-5}$, the WVTR $125 \times 10^{-3}$, HWEP$>0.25$ kPa.

The hardness of these compositions was 91A for that of Example 6, 90A for that of Examples 7 and 8. The flexural moduli were respectively 89 MPa and 85 MPa.

EXAMPLE 9

In a preferred embodiment of this invention, an 86/14 blend of ethylene copolymers P-1/P-2 containing 9% of hydrocarbon plasticizing oil O-1, was melt blended with aluminum oxide trihydrate (F-1, Table 2), said filler being present at a level of 28% by volume. The antagonizer was stearic acid (A-3, Table 3), employed at the level of $0.99 \times 10^{-5}$ mole/m². The blended material was pelletized and flat-die extruded to form a film which was stretched on nip rolls at fixed differential speed in the machine direction 7-fold and subsequently on a tenter frame 2-fold, both stretches having been effected at a film temperature of about 35° C. The film was then heat set under strain in the tenter frame at 65° C. WVP was $14 \times 10^{-5}$, WVTR $20 \times 10^{-3}$, and HWEP 255.3 kPa.

EXAMPLE 10 (Comparative)

In this example, less than an effective antagonizer concentration and a reactive filler were used. A composition containing the copolyetherester P-4 (Table 1), MT thermal carbon black (F-7, Table 2), and polypropylene glycol sebacate antagonizer (A-2, Table 3) at a level of $0.10 \times 10^{-5}$ mole/m$^2$ was melt blended and formed into a film by compression molding. It could not be stretched in a pantograph at 30° C. Scanning electron microscopy revealed a structure in which filler particles were completely or mostly covered and wetted by the polymer matrix, in contrast to the loose-filler effects seen in Example 1. The sample failed by brittle fracture.

Samples of similar composition but containing an amount of antagonizer within the scope of this invention were more stretchable, but exhibited higher recovery than the matrix polymer alone, effectively preventing formation of permanent pores. The high degree of surface activity associated with carbon black appeared to lead to increased recovery of the film, probably because of chemically induced crosslinking of the film, which thus lost its thermoplastic character and became thermosetting. This suggests that fillers with reactive surfaces are detrimental to the success of this invention, even when an antagonizer is present in the proper amount.

EXAMPLE 11

The polymer of Example 1 was melt blended with glass spheres (F-4, Table 2) to a level of 39% by volume. No antagonizer or plasticizer was employed. Although the nominal surface tension of glass is 1200 mJ/cm$^2$, and extensive wetting and adhesion would be expected to occur between the polymer and the filler, it was found that organic contamination, present in the air, coated the surface of the glass, so that the glass behaved like a surface having a lower surface tension. The presence of an organic coating on the glass surface was directly substantiated by ESCA (X-ray photoelectron spectroscopy) surface analysis. The effect of such coating was observed by measuring contact angles of various liquids on a glass microscope slide. Organic liquids above surface tension of 30 mJ/cm$^2$ had contact angles of 40° or greater. Even those with surface tensions below 30 mJ/m$^2$ had contact angles larger than 0°. The surface tension of the contaminated glass spheres was approximately equal to that of the polymer (about 28 mJ/m$^2$ the mixing temperature, and the glass surface would have been expected to be wet little or not at all. This indeed was the case. The compression molded film was stretchd biaxially 2.5-fold in a pantograph at 45° C. The WVP was $1.7 \times 10^{-5}$, WVTR $0.89 \times 10^{-3}$ and HWEP 96.6 KPa.

EXAMPLES 12-15

These examples show the criticality of stretching temperature.

The polymer of Example 1 was combined with 9.5% plasticizer O-1, precipitated calcium carbonate (F-3, Table 2) at a level of 26% by volume, and stearic acid (A-3, Table 3) as the antagonizer. Scanning electron microscopy, small angle x-ray diffraction, and light scattering particle size analysis all showed that the filler in this and other compositions containing ethylene/vinyl acetate polymers and filler F-3 was present in two populations, one containing discrete particles, the other agglomerates of an average particle size of about 3 μm; it was not possible to determine quantitatively the percentage agglomerated but it was very significant. For this reason, the range of antagonizer agent concentration can only be estimated as being between 0.89 and $44 \times 10^{-5}$ mole/m$^2$. Compression molded films of this material stretched non-uniformly and were subject to fracture Nonetheless microporous films were repeatedly fabricated by stretching, and reproducibility was high. When stretched on a pantograph 1.75-fold at 30° C., WVP was $21 \times 10^{-5}$, WVTR $11 \times 10^{-3}$, and HWEP 414 KPa. The hardness of this composition was 88A and the flexural modulus, 90.4 MPa.

The Vicat softening temperature of polymer P-3 containing 9% of plasticizer O-1 (Table 4) was found to be 50° C. All four compression molded films of these examples were stretched 1.75-fold biaxially, and at different temperatures, namely, at 30°, 40°, 50°, and 60° C. Even at 40° C. some decrease in permeability and some loss of control of pore size was observed, as compared with the results at 30° C. At and above the Vicat point of 50° C., the effect was increasing loss of permeability. This can be seen in Table 6.

EXAMPLE 16

Polymer P-3 (Table 1) was combined with filler F-2 (Table 2) which was at a level of 34% by volume. The antagonizer was a diethylcyclohexylamino salt of lauryl sulfate (A-6, Table 3). A compression molded film was stretched biaxially 1.75-fold on a pantograph at 25° C. The WVP was $290 \times 10^{-5}$, WVTR $134 \times 10^{-3}$, and HWEP 62.1 KPa.

EXAMPLE 17

The composition of Example 9 was fabricated as extrusion blown film, subsequently stretched 2.25-fold in the machine direction at 28° C. It was then subjected to 6 Mrads of electron beam irradiation. The WVP was $1.2 \times 10^{-5}$, WVTR $2.2 \times 10^{-3}$, and HWEP was 414 KPa. Samples of the same material not subject to electron beam irradiation had an average WVP of $1.5 \times 10^{-5}$.

EXAMPLE 18

The copolyetherester P-4 (Table 1) was plasticized with plasticizer O-2, Table 4 to 50% by weight. Incorporated into it was a powder of nylon-6,6 (F-6, Table 2) at a level of 30% by volume. Since the surface tension at the mixing temperature of the polymer (about 200° C.) was about 28 mJ/m$^2$ and that of the nylon about 34 mJ/m$^2$, that is, they were nearly equal, no antagonizer was necessary. The melting point of the nylon powder was about 300° C. A compression molded film of the composition of this example was stretched biaxially at 81° C.—about equal to the Vicat temperature of the plasticized polymer—on a pantograph 1.75-fold. The WVP was $20 \times 10^{-5}$, WVTR $15 \times 10^{-3}$, and HWEP 62.1 KPa.

EXAMPLE 19

The copolyetherester P-4 (Table 1) was plasticized with plasticizer O-2 (Table 3) to 25% by weight. Incorporated into the plasticized polymer was a powder of poly(styrene-divinyl benzene) (F-5, Table 2) beads at a level of 30% by volume. Although the surface tension of the beads at the mixing temperature was about 29 mJ/m$^2$, a hydrocarbon antagonizer (A-5, Table 3) was employed nonetheless at a level of $55 \times 10^{-5}$ mole/m$^2$. A compression molded film was stretched 2.25-fold biaxially on a pantograph at 79° C. The WVP was $22 \times 10^{-5}$, WVTR $12 \times 10^{-3}$, and HWEP 20.7 KPa.

EXAMPLE 20

The polymer and filler were combined as in Example 19 but both plasticizer and antagonizer were omitted. A compression molded film was stretched 2-fold biaxially on a pantograph at 80° C. WVP was $13 \times 10^{-5}$, WVTR $3.8 \times 10^{-3}$, and HWEP >0.25 KPa.

EXAMPLE 21

The polymer and filler of Examples 19 and 20 were combined as before; the antagonizer was still omitted but the polymer was plasticized to 50% by weight. A compression molded film was stretched 2-fold biaxially on a pantograph at 80° C. WVP was $34 \times 10^{-5}$, WVTR $17 \times 10^{-3}$, and HWEP >0.25 KPa.

EXAMPLE 22

The polymer and filler were combined as in Examples 20 and 21; this time the plasticizer was omitted but the antagonizer (A-5) was incorporated at the level of $30 \times 10^{-5}$ mole/m$^2$. A compression molded film was stretched 2-fold biaxially on a pantograph at 80° C. WVP was $35 \times 10^{-5}$, WVTR, $20 \times 10^{-3}$ HWEP >0.25. That the HWEP of the films of Examples 22-25 was very low is not surprising in the light of the large size of the filler and the large size of the voids nucleated thereby. However, these examples clearly show the surprising effect of very small amounts of antagonizer on the ability to form pores. Even in cases where antagonizer is not necessary for the formation of microporous films, it is often helpful.

EXAMPLE 23

Amorphous polyamide terpolymer, P-5 (Table 1), was plasticized with plasticizer O-3 (Table 3), and filled to a level of 30% by volume with aluminum oxide trihydrate F-8 (Table 2). Hydrocarbon antagonizer A-4 (Table 3) was employed at a level of $1.3 \times 10^{-5}$ mole/m$^2$. A compression molded film was stretched 1.5-fold biaxially on a pantograph at 99° C. The Vicat softening point of the plasticized polymer was 125° C. The WVP was $2.1 \times 10^{-5}$, WVTR $1.1 \times 10^{-3}$, HWEP 414 KPa. Nylon itself is hygroscopic; an unstretched film of this composition had a WVP of about $0.61 \times 10^{-5}$. This particular polymer showed annealing (crystallization) at room temperature, so that a film which was soft and pliable after stretching, became much stiffer after being kept at room temperature for a few hours.

A film such as produced in this example has particular utility as a semipermeable membrane which can be formed as made into any desired shape (e.g., cylindrical), which then is set as the film undergoes crystallization, thus retaining its shape without support. The degree and rate of film crystallization can be controlled, i.e., by varying the annealing temperature.

TABLE 5

COMPOSITIONS USED IN FABRICATION OF MICROPOROUS FILMS

| EX. NO. | POLYMER | PLASTICIZER (% OF POLY.) | FILLER (VOL %) | AV. EQ. DIA. (MAX.) | ELEMENDORF TEAR STR. STRETCHED FILM (g/mm) | ANTAGONIZER TYPE | MOLES/m$^2$ PART. × 10$^{-5}$ | SHORE HARD. | FLEX. MOD. (MPA) |
|---|---|---|---|---|---|---|---|---|---|
| 1 | P-3 | NONE | F-2 (19) | 5.7 (22) | — | A-1 | 3.90 | 84A | |
| 2 | P-6 | NONE | F-2 (25) | 5.7 (22) | >40,000 | A-1 | 3.10 | 27C | 9.3 |
| 3 | P-7 | NONE | F-2 (30) | 5.7 (22) | 1350 | A-1 | 1.20 | 54C | 65.7 |
| 4 | P-7 | NONE | F-2 (30) | 5.7 (22) | — | A-1 | 0.60 | | |
| 5 | P-8 | NONE | F-2 (36) | 5.7 (22) | 360 | A-1 | 2.60 | 92C | 1535.0 |
| 6 | P-3 | NONE | F-1 (29) | 0.7 (5.5) | — | A-1 | 0.42 | 91A | 89.0 |
| 7,8 | P-3 | NONE | F-1 (29) | 0.7 (5.5) | — | A-1 | 0.59 | 90A | 85.0 |
| 9,17 | P-1/P-2 86/14 | O-1 (9) | F-1 (28) | 0.7 (5.5) | — | A-3 | 0.99 | | |
| 10 | P-4 | NONE | F-7 (30) | 0.3 NOM | — | A-2 | 0.10 | | |
| 11 | P-3 | NONE | F-4 (39) | 9.2 (22) | 6800 | NONE | 0.00 | | |
| 12-15 | P-3 | O-1 (9.5) | F-3 (26) | 0.07-3.0 | >40,000 | A-3 | 0.89-44 | 88A | 90.4 |
| 16 | P-3 | NONE | F-2 (34) | 5.7 (22) | — | A-6 | 6.40 | | |
| 18 | P-4 | O-2 (50) | F-6 (30) | 5.4 (16) | — | NONE | 0.00 | | |
| 19 | P-4 | O-2 (25) | F-5 (30) | 50 (125) | — | A-5 | 55.00 | | |
| 20 | P-4 | NONE | F-5 (30) | 50 (125) | — | NONE | 0.00 | | |
| 21 | P-4 | O-2 (50) | F-5 (30) | 50 (125) | — | NONE | 0.00 | | |
| 22 | P-4 | NONE | F-5 (30) | 50 (125) | — | A-5 | 30.00 | | |
| 23 | P-5 | O-3 (10) | F-8 (30) | 1.2 NOM | — | A-4 | 1.30 | | |

TABLE 6
EXPERIMENTAL DATA SUMMARY

| EXAMPLE NO. | FILM TYPE | STRETCH METHOD/RATIO/TEMP. (°C.) | WVP kg/m² · sec MPa/cm × 10⁻⁵ | THICKNESS (μm) | WVTR kg/m² · sec MPa × 10⁻³ | HWEP kPa |
|---|---|---|---|---|---|---|
| 1 | CM | PANTO/2.5X 2.5X/ROOM | 5.8 | 140 | 4.1 | 21 |
| 2 | CM | PANTO/3.75X 3.75X/26 | 5.3 | 483 | 11 | 27.6 |
| 3 | CM | PANTO/2.5X 2.5X/ROOM | 0.59 | 290 | 0.20 | >414 |
| 4 | CM | PANTO/DNS/ROOM | — | — | — | — |
| 5 | CM | PANTO/2X 2X/70 | 36.0 | 262 | 136 | 0 |
| 6 | CM | PANTO/DNS/30 | — | — | — | — |
| 7 | CM | PANTO/2.75X 2.75X/30 | 55 | 36 | 98 | >0.25 |
| 8 | CM | PANTO/2.63X 2.56X/30 | 87 | 69 | 125 | >0.25 |
| 9 | FLAT DIE | MD-TD SEQ./7X 2X/35 | 14 | 74 | 20 | 255.3 |
| 10 | CM | PANTO/DNS/30 | — | — | — | — |
| 11 | CM | PANTO/2.5X 2.5X/45 | 1.7 | 190 | 0.89 | 96.6 |
| 12 | CM | PANTO/1.75X 1.75X/30 | 21 | 200 | 11 | 414 |
| 13 | CM | PANTO/1.75X 1.75X/40 | 13 | 120 | 11 | 317.4 |
| 14 | CM | PANTO/1.75X 1.75X/50 | 1.3 | 130 | 1.1 | 414 |
| 15 | CM | PANTO/1.75X 1.75X/60 | 0.18 | 120 | 0.15 | 414 |
| 16 | CM | PANTO/1.75X 1.75X/25 | 290 | 220 | 134 | 62.1 |
| 17 | BLOWN | MD/2.25X/28 | 1.2 | 56 | 2.2 | 414 |
| 18 | CM | PANTO/1.75X 1.75X/81 | 20 | 130 | 15 | 62.1 |
| 19 | CM | PANTO/2.25X 2.25X/79 | 22 | 200 | 12 | 20.7 |
| 20 | CM | PANTO/2X 2X/80 | 13 | 350 | 3.8 | >0.25 |
| 21 | CM | PANTO/2X 2X/80 | 34 | 200 | 17 | >0.25 |
| 22 | CM | PANTO/2X 2X/80 | 35 | 180 | 20 | >0.25 |
| 23 | CM | PANTO/1.5X 1.5X/99 | 2.1 | 200 | 1.1 | 414 |

Note:
The following abbreviations are used in Table 6:
CM = compression molded
PANTO = pantograph
DNS = did not stretch
SEQ. = sequentially
MD = machine direction

I claim:

1. A microporous, tear resistant film substantially free of cracks detectable with an electron microscope and having a water vapor permeability of at least $$1.1 \times 10^{-5} \frac{kg/m^2 \cdot sec}{MPa/cm}$$

according to ASTM 96-66BW (inverted cup method) and possessing hydrostatic resistance to the penetration of liquid water of at least 0.25 kPa, said film being made by a process comprising a stretching at a temperature no higher than about 10° C. above the Vicat softening point but at least 10° C. above the glass transition temperature of the matrix polymer a precursor film having at most very low porosity and consisting essentially of the following components:
  (a) a matrix of a thermoplastic orientable polymer characterized by
    (1) a hydrophobic surface, as indicated by a contact angle between said surface and a droplet of water of at least about 40°;
    (2) a glass transition temperature, Tg, of less than about 25° C.;
    (3) a Vicat softening point, Tv, of more than about 25° C.;
    (4) ultimate elongation at some temperature between Tg and Tv of at least 100%; and
    (5) a flexural modulus at 25° C. of less than about 200 MPa;
  said thermoplastic orientable matrix polymer being a polymer selected from the group consisting of ethylene copolymers and copolyesters;
  (b) about 20–40%, based on the volume of the final composition, of a particulate filler chemically nonreactive with the polymer matrix and dispersed therein by melt-blending, said filler being characterized by
    (1) a sufficiently high softening temperature to avoid particle distortion at the lowest temperature at which the matrix polymer is sufficiently fluid to be satisfactorily melt-blended;
    (2) an aspect ratio of less than about 3;
    (3) an average equivalent spherical diameter of about 0.05–50 μm;
    (4) an at most negligible electrostatic or dipole attraction to the matrix polymer; and
    (5) a surface tension which either has at the lowest temperature at which the matrix polymer is sufficiently fluid to be satisfactorily melt-blended a value at most about equal to that of the matrix polymer of can be corrected to have under the blending conditions at most such a value by the adsorption on its surface of a third component (c);
  said component (c) being an organic compound, which is liquid at the lowest temperatue at which the matrix polymer is sufficiently fluid to be melt-blended and is capable at that temperature of being adsorbed on the surface of filler (b) to the extent of at least about 0.5×10⁻⁵ mole of component (c) per square meter of surface area of filler (b), as calculated from the average equivalent spherical diameter of filler (b), and being present in the blend in an amount at least sufficient to satisfy this requirement; said component (c) being characterized by
    (1) at most negligible solubility in the matrix polymer at the melt-blending temperature;
    (2) chemical inertness to the matrix polymer;
    (3) a number average moelcular weight of about 100–10,000; and (4) a surface tension which at the temperature at which component (c) is liquid has a value at most about equal to that of the matrix polymer; and recovering the resulting microporous film.

2. A microporous film of claim 1 wherein the matrix polymer has a flexural modulus of less than about 100 MPa.

3. A film of claim 1 wherein the ultimate elongation of the amtrix polymer at a temperature comprised between the polymer's glass transition temperature and its Vicat softening point is at least about, 500%.

4. A film of claim 3 wherein the ultimate elongation of the matrix polymer, at least 700%.

5. A film of claim 1 wherein the polymer is selected from ethylene copolymers with at least one comonomer selected from the group consisting of vinyl esters of saturated $C_1-C_4$ carboxylic acids; unsaturated $C_3-C_5$ mono- or dicarboxylic acids, their salts with ammonia and with metals of Groups I-IV of the Periodic Chart of the Elements, and their $C_1-C_8$ alkyl esters; terpolymers of the general formula E/X/Y, where E stands for ethylene, X for vinyl acetate or a butyl acrylate, and Y for carbon monoxide or sulfur dioxide, the weight proportion of comonomer Y being up to about 15%; and elastomeric dipolymers and terpolymers of ethylene with other 1-olefins and 1,4-dienes.

6. A film of claim 1 wherein the polymer is a copolymer of phthalic acid with 1,4-butanediol and poly(tetramethyleneether glycol).

7. A film of claim 1 wherein the matrix polymer is a blend of two or more polymers, which individually may not satisfy all the critical requirements recited for the polymer material, provided the blend satisfies those requirements.

8. A film of claim 7 wherein the matrix polymer is a polymer blend selected from blends of two different ethylene/vinyl acetate copolymers and blends of polyvinyl chloride with an ethylene/vinyl acetate/carbon monoxide terpolymer.

9. A film of claim 1 wherein the composition from which film is made contains a plasticizer soluble in the polymer matrix.

10. A film of claim 1 wherein the average equivalent spherical diameter of the filler is about 0.10 to 5 μm.

11. A film of claim 1 in which the particle size distribution is such that fewer than about 1% of the particles exceed an average equivalent spherical diameter of about 20 μm.

12. A film of claim 11 in which the particle size distribution is such that fewer than about 1% exceed about 10 μm.

13. A film of claim 11 in which the amount of filler in the composition is about 25-35 volume percent.

14. A film of claim 1 wherein the composition from which film is made also contains an antagonizer, which satisfies the requirements of component (c) of claim 1.

15. A film of claim 14 wherein the surface contact angle of the antagonizer on the surface of the polymer is less than about 40°; the antagonizer is nonfugitive during compounding, and is a low-viscosity liquid at the compounding temperature.

16. A film of claim 15 wherein the rate of streching of film is about 1-100% per second.

17. A film of claim 16 wherein the film is stretched biaxially to an extent of at least 50% in each direction.

18. A film of claim 16 wherein the film is uniaxially streched at least 125%.

19. The film of claim 1, wherein the matrix polymer is an ethylene/vinyl acetate copolymer, and the filler is calcium carbonate.

20. The film of claim 21, wherein the matrix polymer is an ethylene/vinyl acetate copolymer, and the filler is calcium carbonate.

21. A soft, tear resistant, microporous film substatially free of cracks detectable with an electron microscope and consisting essentially of a polymer matrix and a particulate filler material dispersed therein, said film having a water vapor permeability of at least $$1.1 \times 10^{-5} \frac{kg/m^2 \cdot sec}{MPa/cm}$$

according to ASTM 96-66BW (inverted cup method) and possessing hydrostatic resistance to the penetration of liquid water of at least 0.25 kPa,
the film composition consisting essentially of the following components:
(a) a matrix of a thermoplastic orientable polymer characterized by
(1) a hydrophobic surface, as indicated by a contact angle between said surface and a droplet of water of at least about 40°;
(2) a glass transition temperature, Tg, of less than about 25° C.;
(3) a Vicat softening point, Tv, of more than about 25° C.;
(4) ultimate elongation at some temperature between Tg and Tv of at least 100%; and
(5) a flexural modulus at 25° C. of less than about 200 MPa;
said thermoplastic orientable matrix polymer being a polymer selected from the group consisting of copolymers of ethylene and copolyesters;
(b) about 20-40%, based on the volume of the final composition, of a particulate filler chemically nonreactive with the polymer matrix and dispersed therein, said filler being characterized by
(1) a softening point sufficiently high to avoid particle distortion at the lowest temperature at which the matrix polyer has sufficient fluidity to be satisfactorily melt-blended;
(2) an aspect ratio of less than about 3;
(3) an average equivalent spherical diameter of about 0.05-50 μm;
(4) an at most negligible electrostatic or dipole attraction to the matrix polymer; and
(5) a surface tension which either has at the lowest temperature at which the matrix polymer is sufficiently fluid to be satisfactorily melt-blended a value at most about equal to that or the matrix polymer or can be corrected to have at that temperature at most such a value by the adsorption on its surface of a third component (c);
said component (c) being an organic compound, which is liquid at the lowest temperature at which the matrix polymer is sufficiently fluid to be melt-blended and is capable at that temperature of being adsorbed on the surface of filler (b) to the extent of at least about $0.5 \times 10^{-5}$ mole of component (c) per square meter of surface area of filler (b), as calculated from the average equivalent spherical diameter of filler (b), and being present in the blend in an amount at least sufficient to satisfy this requirement; said component (c) being characterized by (1) at most neglible solubility in the matrix polymer at the melting temperature of the matrix polymer;

(2) chemical inertness to the matrix polymer;

(3) a number average molecular weight of about 100–10,000; and (4) a surface tension which at the temperature at which component (c) is liquid has a value at most about equal to that of the matrix polymer.

22. A film of claim 21 wherein the matrix polymer has a flexural modulus of less than about 100 MPa.

23. A film of claim 21 wherein the Vicat softening point of the matrix polymer is above about 45° C.

24. A film of claim 21 wherein the ultimate elongation of the matrix polymer at a temperature comprised between the polymer's glass transition temperature and its Vicat softening point is at least about 500%.

25. A film of claim 24 wherein the ultimate elongation of the matrix polymer at least 700%.

26. A film of claim 21 wherein the polymer is selected from ethylene copolymers with at least one comonomer selected from the group consisting of vinyl esters of saturated $C_1$–$C_4$ carboxylic acids; unsaturated $C_3$–$C_5$ mono- or dicarboxylic acids, their salts with ammonia and with metals of Groups I-IV of the Periodic Chart of the Elements, and their $C_1$–$C_8$ alkyl esters; terpolymers of the general formula E/X/Y, where E stands for ethylene, X for vinyl acetate or a butyl acrylate, and Y for carbon monoxide or sulfur dioxide, the weight proportion of comonomer Y being up to about 15%; and elastomeric dipolymers and terpolymers of ethylene with other 1-olefins and 1,4-dienes.

27. A film of claim 21 wherein the polymer is a copolymer of phthalic acid with 1,4-butanediol and poly(tetramethyleneether glycol).

28. A film of claim 21 wherein the matrix polymer is a blend of two or more polymers, which individually may not satisfy all the critical requirements recited for the polymer material, provided the blend satisfies those requirements.

29. A film of claim 28 wherein the matrix polymer is a polymer blend selected from blends of two different ethylene/vinyl acetate copolymers and blends of polyvinyl chloride with an ethylene/vinyl acetate/carbon monoxide terpolymer.

30. A film of claim 21 wherein the composition from which film is made contains a plasticizer soluble in the polymer matrix.

31. A film of claim 21 wherein the average equivalent spherical diameter of the filler is about 0.10 to 5 μm.

32. A film of claim 21 in which the particle size distribution is such that fewer than about 1% of the particles exceed an average equivalent spherical diameter of about 20 μm.

33. A film of claim 32 in which the particle size distribution is such that fewer than about 1% exceed about 10 μm.

34. A film of claim 21 in which the amount of filler in the composition is about 25–35 volume percent.

35. A film of claim 21 wherein the composition from which the film is made also contains an antagonizer, which satisfies the requirements of component (c) in claim 21.

36. A film of claim 35 wherein the surface contact angle of the antagonizer on the surface of the polymer is less than about 40°; the antagonizer is nonfugitive during compounding, and is a low-viscosity liquid at the compounding temperature.

37. A film of claim 36 which is stretched biaxially to an extent of at least 50% in each direction.

38. A film of claim 36 which is stretched uniaxially to an extent of at least 125%.

39. A process for making a soft, tear resistant, microporous film consisting essentially of a polymer matrix and a particulate filler material dispersed therein, said film being substantially free of cracks detectable with an electron microscope and having a water vapor permeability of at least $$1.1 \times 10^{-5} \frac{kg/m^2 \cdot sec}{MPa/cm}$$

according to ASTM 96-66BW (inverted cup method) and possessing hydrostatic resistance to the penetration of liquid water of at least 0.25 kPa, said process comprising stretching at a temperature no higher than about 10° C. above the Vicat softening point but at least 10° C. above the glass transition temperature of the matrix polymer a precursor film at most very low porosity and consisting essentially of the following components:

(a) a matrix of a thermoplastic orientable polymer characterized by (1) a hydrophobic surface, as indicated by a contact angle between said surface and a droplet of water of at least about 40°;

(2) a glass transition temperature, Tg, of less than about 25° C.;

(3) a Vicat softening point, Tv, of more than about 25° C.;

(4) ultimate elongation at some temperature between Tg and Tv of at least 100%; and (5) a flexural modulus at 25° C. of less than about 200 MPa;

said thermoplastic orientable matrix polymer being a polymer selected from the group consisting of ethylene copolymers and copolyesters;

(b) about 20–40%, based on the volume of the final composition, of a particulate filler chemically nonreactive with the polymer matrix and dispersed therein by melt-blending, said filler being characterized by (1) a sufficiently high softening temperature to avoid particle distortion at the lowest temperature at which the matrix polymer is sufficiently fluid to be satisfactorily melt-blended;

(2) an aspect ratio of less than about 3;

(3) an average equivalent spherical diameter of about 0.05–50 μm;

(4) an at most negligible electrostatic or dipole attraction to the matrix polymer; and (5) a surface tension which either has at the lowest temperature at which the matrix polymer is sufficiently fluid to be satisfactorily melt-blended a value at most about equal to that of the matrix polymer or can be corrected to have under the blending conditions at most such a value by the adsorption on its surface of a third component (c);

said component (c) being an organic compound, which is liquid at the lowest temperature at which the matrix polymer is sufficiently fluid to be satisfactorily melt-blended and is capable at that temperature of being adsorbed on the surface of filler (b) to the extent of at least about $0.5 \times 10^{-5}$ mole of component (c) per square meter of surface area of filler (b), as calculated from the average equivalent spherical diameter of filler (b), and being present in the blend in an amount at least sufficient to satisfy this requirement; said component (c) being characterized by
   (1) at most negligible solubility in the matrix polymer at the melt-blending temperature;
   (2) chemical inertness to the matrix polymer;
   (3) a number average molecular weight of about 100–10,000; and
   (4) a surface tension which at the temperature at which component (c) is liquid has a value at most about equal to that of the matrix polymer;
and recovering the resulting microporous film.

40. Process of claim 39 wherein the matrix polymer has a flexural modulus of less than about 100 MPa.

41. Process of claim 40 wherein the Vicat softening point of the matrix polymer is above about 45° C.

42. Process of claim 39 wherein the ultimate elongation of the matrix polymer at a temperature comprised between the polymer's glass transition temperature and its Vicat softening point is at least about 500%.

43. Process of claim 42 wherein the ultimate elongation of the matrix polymer is at least 700%.

44. Process of claim 39 wherein the polymer is selected from ethylene copolymers with at least one comonomer selected from the group consisting of vinyl esters of saturated $C_1$-$C_4$ carboxylic acids; unsaturated $C_3$-$C_5$ mono- or dicarboxylic acids, their salts with ammonia and with metals of Groups I–IV of the Periodic Chart of the Elements, and their $C_1$-$C_8$ alkyl esters; terpolymers of the general formula E/X/Y, where E stands for ethylene, X for vinyl acetate or a butyl acrylate, and Y for carbon monoxide or sulfur dioxide, the weight proportion of comonomer Y being up to about 15%; and elastomeric dipolymers and terpolymers of ethylene with other 1-olefins and 1,4-dienes.

45. Process of claim 39 wherein the polymer is a copolymer of phthalic acid with 1,4-butanediol and poly(tetramethyleneether glycol).

46. Process of claim 39 wherein the matrix polymer is a blend of two or more polymers, which individually may not satisfy all the critical requirements recited for the polymer material, provided the blend satisfies those requirements.

47. Process of claim 46 wherein the matrix polymer is a polymer blend selected from blends of two different ethylene/vinyl acetate copolymers and blends of polyvinyl chloride with an ethylene/vinyl acetate/carbon monoxide terpolymer.

48. Process of claim 39 wherein the composition from which film is made contains a plasticizer soluble in the polymer matrix.

49. Process of claim 39 wherein the average equivalent spherical diameter of the filler is about 0.10 to 5 μm.

50. Process of claim 39 in which the particle size distribution is such that fewer than about 1% of the particles exceed an average equivalent spherical diameter of about 20 μm.

51. Process of claim 50 in which the particle size distribution is such that fewer than about 1% exceed about 10 μm.

52. Process of claim 50 in which the amount of filler in the composition is about 25–35 volume percent.

53. Process of claim 39 wherein the composition from which film is made also contains an antagonizer, which satisfies the requirements of component (c) of claim 1.

54. A process of claim 53 wherein the surface contact angle of the antagonizer on the surface of the polymer is less than about 40°; the antagonizer is nonfugitive during compounding, and is a low-viscosity liquid at the compounding temperature.

55. Process of claim 54 wherein the rate of stretching of film is about 1–100% per second.

56. Process of claim 55 wherein the film is stretched biaxially to an extent of at least 50% in each direction.

57. Process of claim 55 wherein the film is stretched uniaxially at least 125%.

58. The process of claim 39 wherein the matrix polymer is an ethylene/vinyl acetate copolymer, and the filler is calcium carbonate.

* * * * *